United States Patent [19]

Langevin

[11] Patent Number: 5,653,143
[45] Date of Patent: Aug. 5, 1997

[54] AUTOMATIC MECHANICAL VARIABLE RATIO TRANSMISSION

[76] Inventor: David W. Langevin, 349 Yorktown Ct., Upland, Calif. 91786

[21] Appl. No.: 471,854

[22] Filed: Jun. 6, 1995

[51] Int. Cl.⁶ .................................................. F16H 3/30
[52] U.S. Cl. ............................ 74/348; 74/333; 74/339; 74/340; 74/341
[58] Field of Search ........................ 74/341, 348, 333, 74/335, 336 R, 337, 339, 340; 476/55; 477/121, 123; 192/3.61, 3.63

[56] References Cited

U.S. PATENT DOCUMENTS

| | | |
|---|---|---|
| 861,069 | 7/1907 | Wood . |
| 918,773 | 4/1909 | Schatz . |
| 1,111,551 | 9/1914 | Adams . |
| 1,169,618 | 6/1916 | Compton . |
| 1,191,771 | 7/1916 | Delacour . |
| 1,443,991 | 2/1923 | Hayden . |
| 1,471,162 | 10/1923 | Iacobacci ........................ 74/348 |
| 1,508,879 | 9/1924 | Healey ............................ 74/348 |
| 1,817,819 | 8/1931 | Healey ............................ 74/348 |
| 1,936,641 | 5/1933 | Voelkl . |
| 2,807,964 | 10/1957 | Ovshinsky ...................... 74/348 |
| 3,608,390 | 9/1971 | Barrett ............................ 74/348 |
| 3,702,571 | 11/1972 | Sainz .............................. 74/341 |
| 5,043,895 | 8/1991 | Hattori et al. .................. 477/75 |
| 5,209,141 | 5/1993 | Asayama et al. .............. 477/121 |

FOREIGN PATENT DOCUMENTS

| | | | |
|---|---|---|---|
| 45511 | 4/1932 | Denmark .................. 74/348 |
| 819451 | 4/1981 | U.S.S.R. .................. 74/348 |

Primary Examiner—Charles A Marmor
Assistant Examiner—Troy Grabow
Attorney, Agent, or Firm—Sheldon & Mak

[57] ABSTRACT

A variable ratio transmission system for coupling a load to a source of rotational power includes a selector shaft having a selector gear axially movable on a fork dolly by an actuator including a lead screw, and a control motor; an inclined cluster shaft having a plurality N of spur gears rotatably supported thereon for being selectively meshed with the selector gear, at least N−1 of the spur gears being variably coupled to the cluster shaft by a one-way clutch for rotation therewith; and a controller for activating the actuator while preventing substantial torque-loading of any of the spur gears unless that spur gear is substantially meshed with the selector gear, the controller comparing a set of operating conditions of the power source with a predetermined operating envelope, and activating the actuator for bringing the set of operating conditions within the operating envelope, the operating conditions including an input operating speed and a set point variable that can be throttle position, torque, power, applied voltage, applied current, modulation duty cycle, or acceleration, the controller being operative for interrupting power from the source for only approximately 0.01 second.

19 Claims, 4 Drawing Sheets

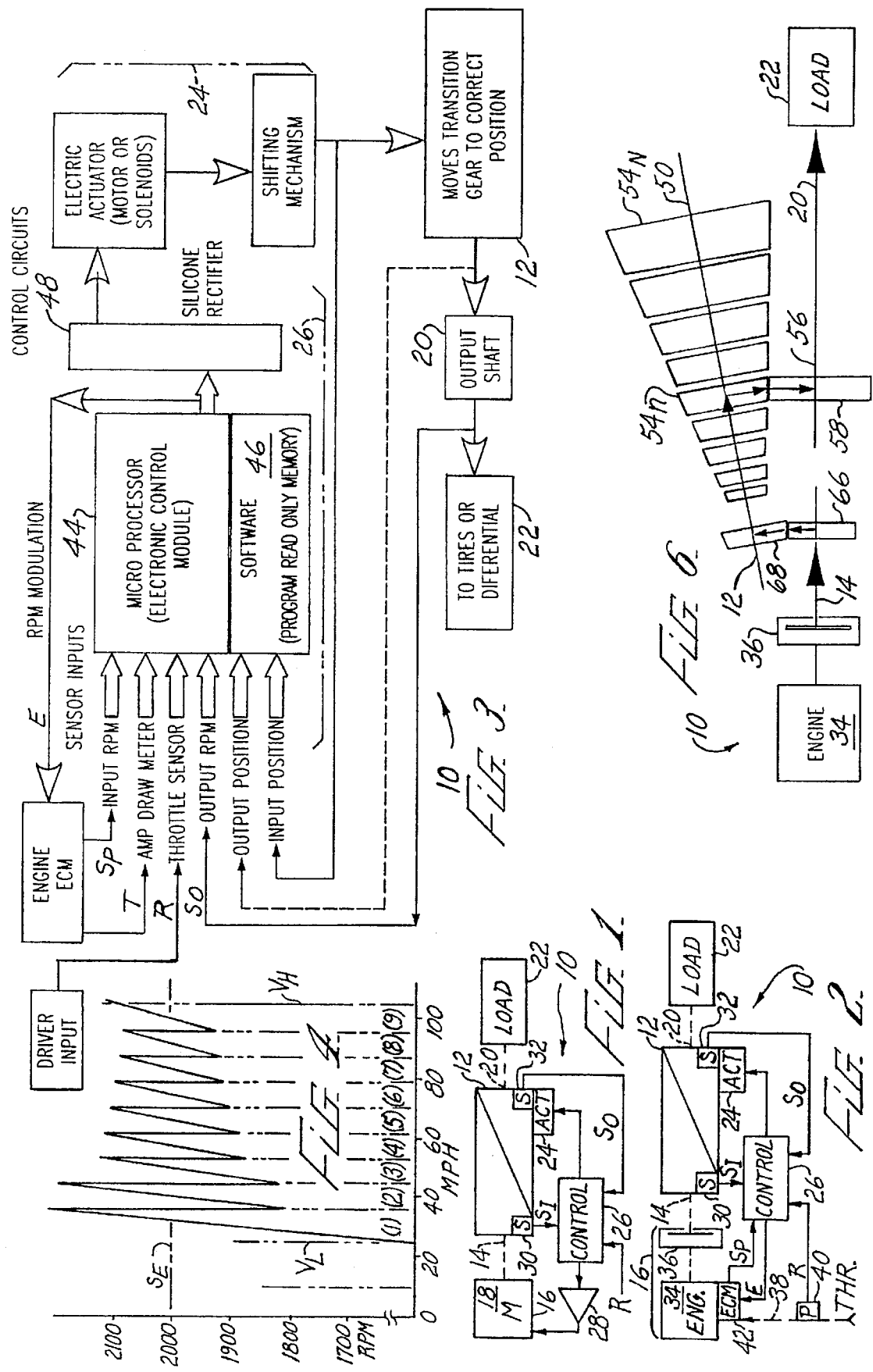

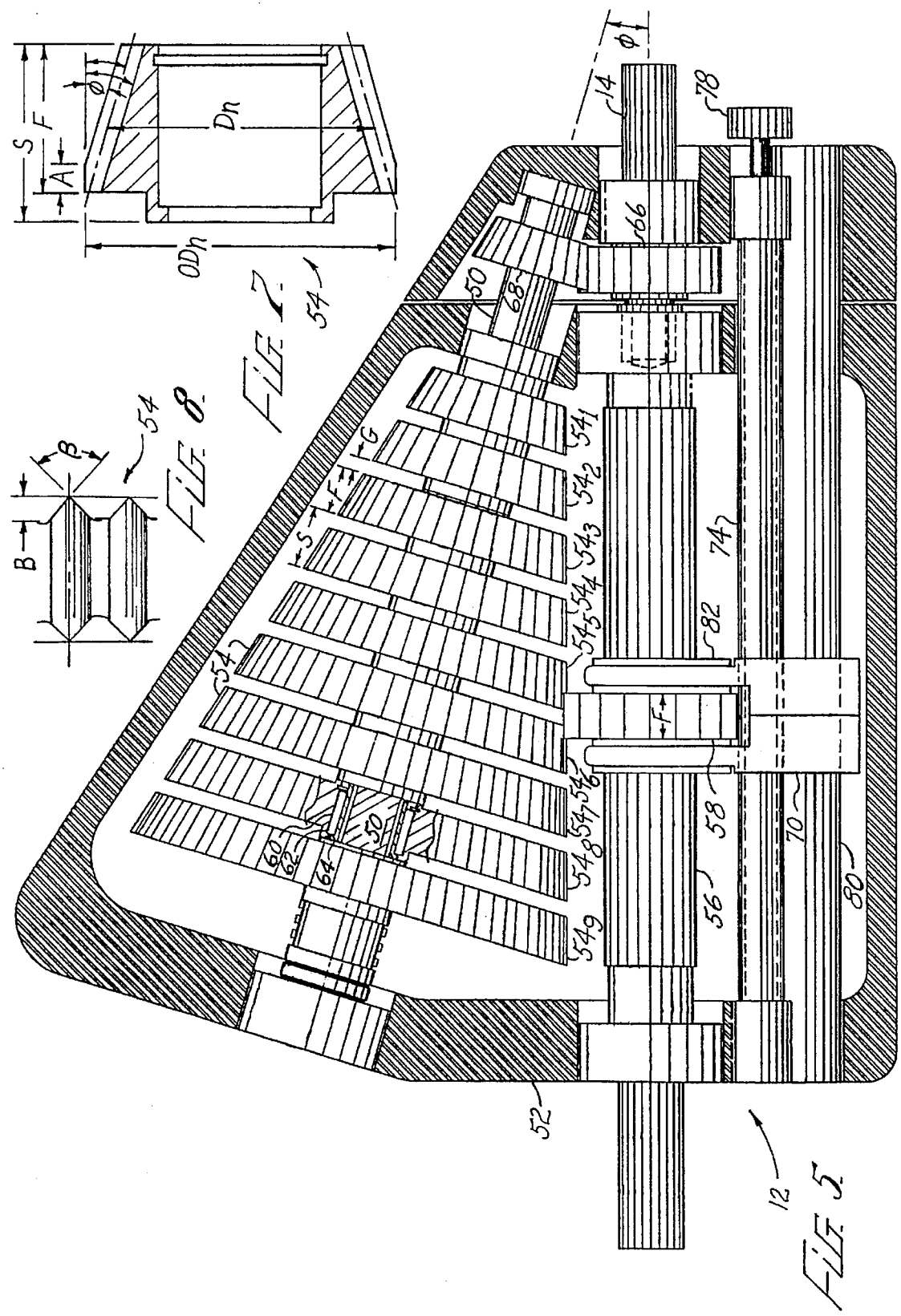

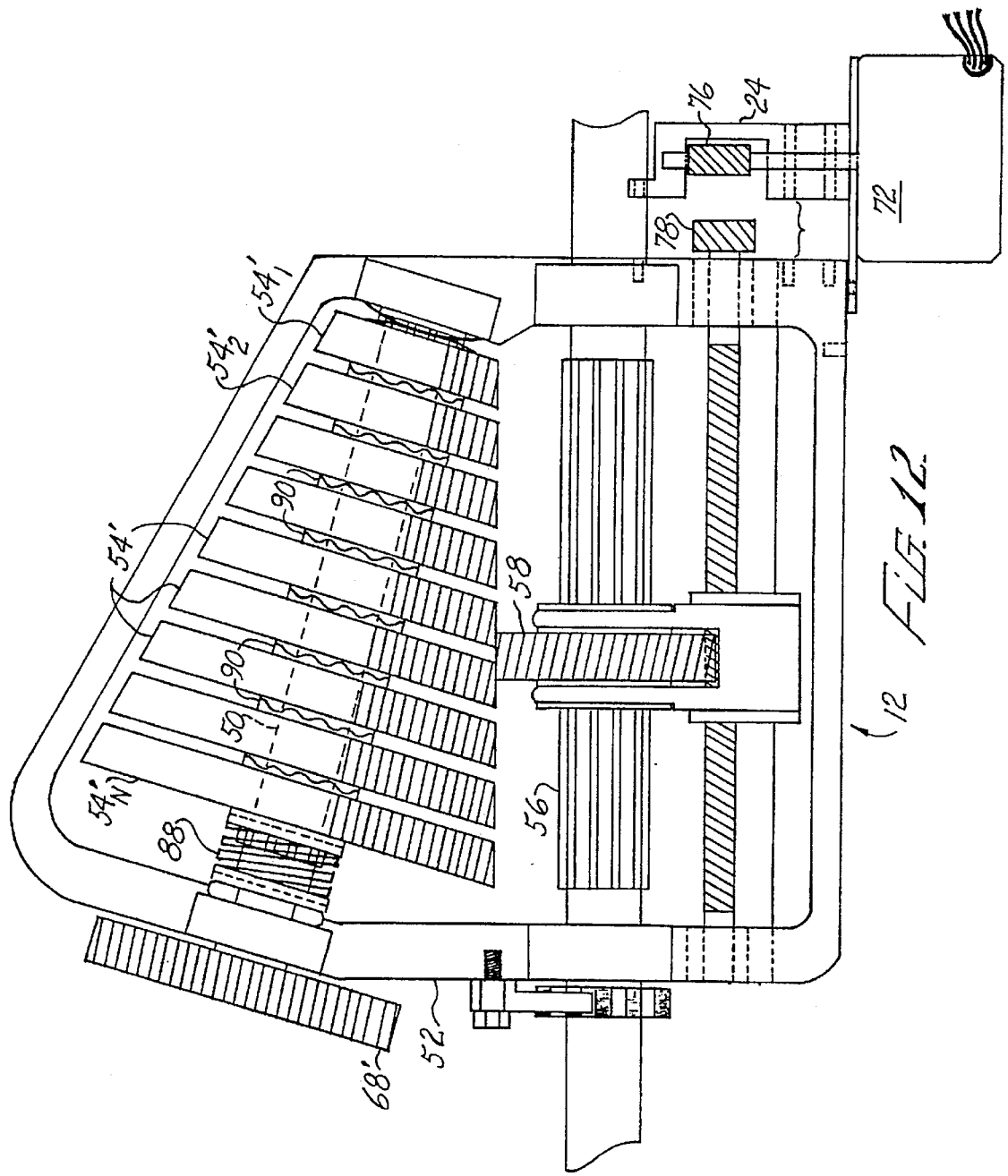

AUTOMATIC MECHANICAL VARIABLE RATIO TRANSMISSION

BACKGROUND

The present invention relates to power transmission devices for rotary power sources such as internal combustion engines and electric motors in applications variably driving inertial loads such as vehicles.

Typical power sources such as electric motors and internal combustion engines have performance characteristics that are greatly dependent on rotational speed (RPM). Principal characteristics include, available torque, power, and efficiency, the efficiency being a function of not only the speed but also the operating torque or power. Variable speed electric motors are typically characterized by a linear torque-speed relation, the speed, which can be bidirectional, being limited by applied voltage, the torque, which also can be bidirectional, being limited by applied current. Thus electric motors are typically quite flexible in terms of operating speed; however, the efficiency is greatly dependent on speed, being greatest within a fairly narrow range of speeds. Internal combustion engines have more severe performance limitations in that they are not only normally unidirectional, but they are substantially inoperative below certain speeds, and the available torque falls off below an intermediate speed (the torque peak). The efficiency of internal combustion engines is also greatly dependent on speed. Moreover, the design of the engines as well as the motors involves serious compromises between maximum performance and efficiency at optimum speeds and flexibility over a wide range of speeds.

Loads such as vehicles present distinctly different load components of inertia, rolling resistance, wind resistance, and climbing resistance which, in combination with the operating characteristics of the power source, dictates a need for a variable ratio transmission connected between the source and the load. Vehicle transmissions are well known, mainly for use with internal combustion engines, in several basic configurations including hydraulic torque converters, torque converters or hydraulic couplings in combination with automatically shifted gearing, and manually shiftable gear trains together with manually operated clutches. As discussed below, each of the transmissions of the prior art is subject to significant disadvantages.

Manually operated transmission gearing and clutches of conventional construction offer high efficiency and more direct control of the load than automatic transmissions. However, they are subject to a number of disadvantages, such as:

1. They require higher driving skill levels and attention, both for reasonably smooth operation and for maintaining reasonably efficient gear ratios;
2. They normally require significant interruptions in power from the engine during gear changes; and
3. They have a very limited number of gear ratios (typically four or five) which must therefore be widely spaced in a compromise between low speed acceleration and climbing ability as against high speed efficiency, with intermediate speeds often being (especially during climbing) such that one ratio is excessively low, yet the next ratio is too high for satisfactory performance and/or efficient operation of the power source.

Automatic transmissions having torque converters combined with the usual planetary gearing are easy to operate and are free from significant power interruptions during gear changes. However, they are excessively heavy, bulky, expensive to provide, and they are significantly inefficient, often requiring dedicated cooling apparatus.

Variable ratio frictional power transmission is also known, by means of wheels that frictionally engage rotating cone-or disk-shaped members at varying radii, or by V-belt drives wherein at least one sheave has variably spaced flanges. These devices are subject to excessive wear and limited torque capacity, and the belt drives are significantly inefficient.

U.S. Pat. No. 1,111,551 to Adams discloses transmission gearing in which a cone-shaped collection of beveled gears, each of the beveled gears having one-way clutch engagement with a common output shaft, another gear being slidably keyed to an independent shaft and shiftable along the independent shaft in engagement with selected ones of the beveled gears. The gearing of Adams, while providing a greater selection of ratios within a given physical space than do conventional manual transmissions, is nevertheless subject to a number of disadvantages. For example:

1. Significant skill is required for selecting a desired gear using the disclosed linear arrangement of detent positions, for simultaneously interrupting power during up-shifts, and for selecting appropriately efficient gear ratios;
2. The gearing is subject to loading with the slidable gear only partially meshed with the higher of two beveled gears, resulting in potential gear failure; and
3. The power interruptions needed for reliably avoiding gear damage (typically 0.3 second to 0.6 second) are undesirable as adversely affecting both performance and comfort.

Thus there is a need for a variable ratio transmission that provides a wide range of closely spaced gear ratios, that is operable without significant power interruptions, and that is easy to use.

SUMMARY

The present invention meets this need by providing a transmission system having a compact cluster of tapered gears that are selectively engagable with a selector gear that is actuated under program control during automatically synchronized power interruptions that are of sufficiently short duration as to not significantly affect performance or comfort. In one aspect of the invention, the transmission system includes a selector shaft having a selector gear axially movable thereon; a selector actuator for driving the selector gear along the selector shaft in response to an external signal; a cluster shaft having a plurality N of spur gears rotatably supported thereon, the cluster shaft being inclined relative to the selector shaft, the spur gears being sized and spaced along the cluster shaft for being selectively meshed with the selector gear, at least N−1 of the spur gears being variably coupled to the cluster shaft for rotation therewith, the selector shaft and the cluster shaft being series-coupleable between the source of rotational power and a load; and a controller for activating the selector actuator while preventing substantial torque-loading of any of the spur gears unless that spur gear is axially in mesh with the selector gear at least approximately 25% of the lesser of the respective face widths of the selector and taper gears, the controller being operative for interrupting power from the source for an interval t that is less than approximately 0.2 second. Each or at least the N−1 spur gears can be coupled to the cluster shaft by a one-way clutch.

The transmission system can include means for biasingly synchronizing adjacent ones of the spur gears in a predetermined phase relationship. The means for synchronizing can have axially engaging ramp surfaces on adjacent ones of the spur gears, at least some of the spur gears being axially movable relative to the cluster shaft in response to relative rotation of the adjacent spur gears, and a biasing element axially loading the ramp surfaces. The biasing element can be a compression spring on the cluster shaft at one side of at least the N−1 spur gears for yieldably resisting axial separation thereof.

The actuator can include a fork dolly supported for movement parallel to the selector shaft, a lead screw rotatably mounted in parallel relation to the selector shaft and threadingly coupled thereto, and a control motor coupled for rotating the lead-screw shaft in response to the controller. Preferably the interval t is not greater than approximately 0.01 second for rendering the interrupting of power substantially undetectable. The control motor can be a stepper motor, the actuator further including a gear coupling between the stepper motor and the lead screw.

Preferably the controller includes means for comparing a set of operating conditions of the power source with a desired predetermined operating envelope, and means for activating the actuator for bringing the set of operating conditions within the operating envelope. The operating conditions can include an input operating speed and a set point variable, the set point variable including a member of the group consisting of throttle position, torque, power, applied voltage, applied current, modulation duty cycle, and acceleration. The operating envelope can include a limiting input speed in association with a maximum output speed, and a threshold input speed in association with a minimum output speed.

The transmission system can further include an auxiliary shaft that is rotatably mounted in concentric relation to one of the cluster shaft and the selector shaft, and being gear-coupled to the other of the cluster shaft and the selector shaft for in-line connection of the transmission system between the power source and the load. Adjacent faces of the spur gears can be separated by a gap G, an interval spacing S of the spur gears being the cluster face width plus the gap G, the gap G being between approximately 15 percent and approximately 35 percent of the spacing S. Preferably the gap G is approximately ⅓ of the spacing S for shortening the required duration of the interval t.

DRAWINGS

These and other features, aspects, and advantages of the present invention will become better understood with reference to the following description, appended claims, and accompanying drawings, where:

FIG. 1 is a functional block diagram of a transmission system for variably coupling a source of rotary power to a load according to the present invention;

FIG. 2 is a functional block diagram showing an alternative configuration of the system of FIG. 1;

FIG. 3 is a more detailed and process-oriented block diagram of the system of FIG. 2;

FIG. 4 is a graph showing operation of the system of FIG. 1;

FIG. 5 is a fragmentary lateral sectional view of a transmission unit of the system of FIG. 1;

FIG. 6 is a diagrammatic view showing a power path of the transmission unit of FIG. 5;

FIG. 7 is a lateral sectional view of a taper gear of the transmission unit of FIG. 5;

FIG. 8 is a lateral detail view of a tooth portion of the gear of FIG. 7;

FIG. 12 is a fragmentary lateral sectional view showing an alternative configuration of the transmission unit of FIG. 5.

DESCRIPTION

Figure 10:
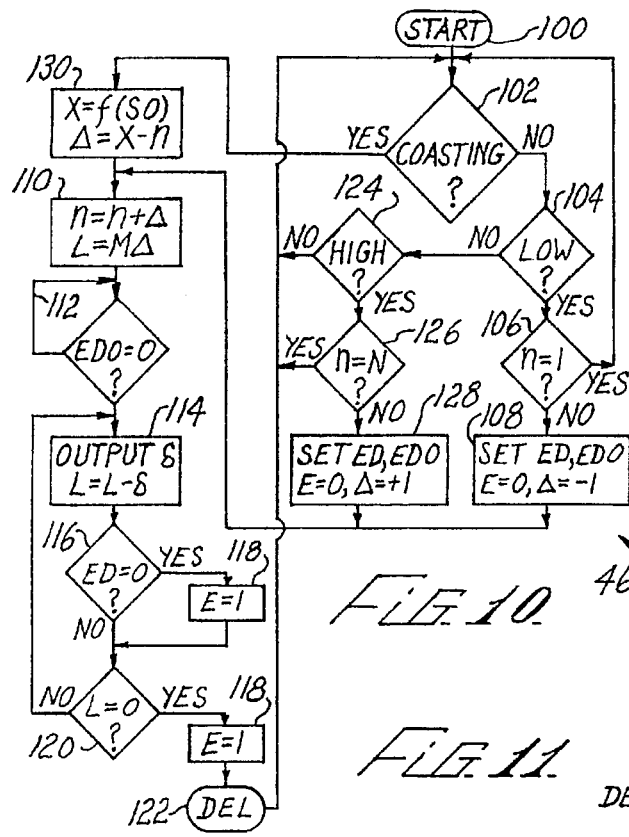
FIG. 10 is a controller program flow chart for the system of FIG. 2.

The present invention is directed to a rotary transmission system that is particularly effective in efficiently coupling power between a source and a load while enabling operation of the source at high efficiency. With reference to FIGS. 1 and 4 of the drawings, a transmission system 10 includes a transmission unit 12 having an input shaft 14 connected to a controllable power source 16 in the form of an electric motor 18, an output shaft 20 of the transmission unit 12 being connected to a load 22. Typically, the load 22 is one or more driving wheels of a vehicle (not shown), the power source 16 powering movement of the vehicle.

The transmission unit 12 includes a gear selector actuator 24 that is responsive to a controller 26 of the system 10, the controller 26 feeding a power amplifier 28 for driving the motor 18, primarily in response to an external set-point variable R that is related to a desired output of the source 16. The transmission unit 12 also includes an input sensor 30 for sensing an input speed $S_I$ of rotation of the input shaft 14 and an output sensor 32 for sensing an output speed $S_O$ of rotation of rotation of the output shaft 20, the controller 26 being responsive to the sensors 30 and 32 as well as to the variable R for activating the actuator 24 while momentarily interrupting operation of the power amplifier 28 as further described below.

As shown in FIG. 4, the system 10 is operational for maintaining of the power source 16 at or near a rotational speed $S_E$ of maximum efficiency while driving the load 22 over a range of speeds as represented by a vehicle velocity range that extends from a low velocity $V_L$ to a high velocity $V_H$, using a plurality N of selectable gear ratios of the transmission unit 12. As further described below, the transmission unit 12 has a relatively high plurality (as compared with conventional vehicle transmissions) of ratios that are relatively closely spaced mathematically, FIG. 4 depicting nine ratios (N=9) that are nearly evenly spaced over an overall ratio range $N_1/N_N$ that is approximately 3.1:1. In FIG. 4, $V_H$ is approximately 105 MPH and $S_E$ is approximately 2000 RPM, the power source operating between approximately 1900 RPM and approximately 2100 RPM when the velocity is between $V_L$=25 MPH and $V_H$=105 MPH. It will be understood that the relation of $S_E$ to $V_H$ is dependent on driving wheel diameter and final drive ratio, and that $S_E$ can vary significantly for different implementations of the power source 16.

With further reference to FIGS. 2, 3, and 5–11, an alternative configuration of the system 10 is implemented with the power source 16 being an internal combustion engine 34, the input shaft 14 being connected through a clutch unit 36 to the engine 34, primarily for permitting operation of the engine (such as at idle) when the vehicle is at rest or nearly at rest. The clutch unit 36, which can be implemented in a variety of ways including a centrifugal clutch, a manual clutch, and a fluid coupling, further provides a degree of cushioning between the engine 34 and the transmission unit 12.

As shown in FIG. 2, the engine is responsive by a throttle mechanism 38 to a throttle control input (THR.), a potentiometer 40 being coupled to the mechanism 38 for providing the set-point variable 26. The engine 34 has associated therewith an electronic control module (ECM) 42 that meters fuel and/or activates ignition for the engine 34 in a conventional manner, the ECM 42 being responsive to an enable signal E from the controller 26 for effecting momentary interruption of the power source 18 as described above and further below. As shown in further detail in FIG. 3, the controller 26 includes a microprocessor 44 having firmware 46 associated therewith for providing the enable signal E and for activating a driver circuit 48 that is connected to the actuator 24, in response to predetermined operating conditions as represented by at least some of the set-point variable R, the input speed $S_I$, the output speed $S_O$, and a source speed $S_P$ and/or a torque variable T (such as manifold vacuum or motor current) of the engine 34 as signaled by the ECM 42. As further shown in FIG. 3, the microprocessor 44 can be responsive to movement of the actuator 24, signalled as an input position and/or an output position thereof, by methods that are known to those having skill in the positioning arts.

FIG. 5 shows a preferred implementation of the transmission unit 12, having a cluster shaft 50 rotatably mounted in a housing 52, a plurality of taper gears 54 thereon, the taper gears 54 being individually designated $54_n$, where n is an integer from 1 to N. A selector shaft 56 is also rotatably supported in the housing 52 and having a selector gear 58 thereon for engaging respective ones of the taper gears 54, the selector gear making splined engagement with the selector shaft 56 for coupling rotation between the selected taper gear 54 to the selector shaft 56. At least N-1 of the taper gears 54 are variably coupled to the cluster shaft 50 for allowing the selector gear 58 to be momentarily engaged with adjacent ones of the taper gears 54 when the selector gear 58 is being shifted by the actuator 24. In the exemplary implementation of FIG. 5, the coupling is by respective one-way clutches 60, each of the clutches 60 having an annular array of sprag members 62 that are located within the gear 54 and about a sleeve 64 having splined engagement with the cluster shaft 50. The sprag members are non-circularly cylindrical for permitting rotational movement of the gear 54 and the cluster shaft 50 in one direction only. Accordingly, each of the one-way clutches 60 is oriented for locking engagement when the transmission unit 12 is powering the load 22 from the power source 16 through the selected taper gear 54, the clutch 60 permitting coasting of the load 12 when the power source 12 is operated at speeds less than those producing the locking engagement.

In the configuration of FIGS. 5 and 6, the input shaft 14 is a separate member, being rotatably supported concentric with the selector shaft 56 and gear-coupled to the cluster shaft 50 by means of an input gear 66 that is fixed on the input shaft 14 and a mating counter gear 68 that is fixed on the cluster shaft 50. Thus the selector shaft 56 functions as the output shaft 20 in this configuration. It will be understood that the functions of the input shaft 14 and the output shaft 20 can be reversed as long as the clutches 60 are properly oriented for positive power transfer through the transmission unit 12. Also, the overall gear ratio of the transmission unit 12 is the product of the ratios associated with the gears 66 and 68 and with the gears 54 and 58. FIG. 6 shows power from the engine 34 being transmitted successively from the input shaft 14, through the input gear 66 and the counter gear 68 to the cluster shaft 50, and through the selected taper gear 54 and the selector gear 58 to the selector shaft 56, being the output shaft 20, for driving the load 22.

In exemplary configurations of the transmission unit 12 as described herein, the cluster shaft 50 is inclined at an angle φ relative to the selector shaft 56, the taper gears 54 being uniformly spaced at a spacing S and having a face width F, the selector gear 58 also having the face width F. Thus the faces of the taper gears 54 are separated by a gap G=S-F. The taper gears 54 are formed with uniformly differing numbers of teeth of matching profile for mating engagement with the selector gear 58, an exemplary configuration of the transmission unit 12 having the numbers of teeth of adjacent taper gears 54 differing by a tooth increment ΔT=6. Using straight-cut teeth of 10 diametral pitch (DP) and with the spacing S=0.75 inch, the angle φ for proper engagement is φ=tan⁻¹(½(6/10)/0.75)=21.8°. Changing the spacing S to 1.00 inch yields φ=sin⁻¹(0.3)=16.67°. The taper gears 54 are preferably formed as shown in FIGS. 7 and 8, having an outside profile of outside diameter $OD_n$ over a width A, and frustro-conically tapered at the angle φ over the remainder of the face width F. Of course, the outside profile of the largest one of the gears 54 can extend at the angle φ over the full face width F. Each of the taper gears 54 is further formed with teeth having a known spur gear profile that is modified as described herein, on a nominal pitchline diameter $D_n = N_n/PD$ as measured midway within the face width F, wherein $N_n$ is the number of teeth of the respective gear $54_n$, the tooth profiles of the respective taper gears 54 each being tapered at the angle φ. As shown in FIG. 8, opposite ends of individual teeth of the taper gears 54 are also tapered circumferentially over an axial distance B on opposite sides thereof and at an included angle β, except that only one end of the teeth of the endmost ones of the taper gears 54 need be circumferentially tapered. The angle β can be approximately 90°, the distance B being approximately 0.08, thereby nearly fully converging opposite sides of the gear teeth for facilitating axially mating engagement with the selector gear 58.

The axial mating engagement with the selector gear 58 is further facilitated by providing the gap G sufficiently large that significant entering engagement with one of the taper gears 54 occurs simultaneously with a corresponding disengagement of the previously engaged gear 54. Thus successive disengagements of previously engaged gears is very slightly prior to substantially full engagement with the next gear. Particularly, it is preferred that the gap G be from approximately 15% to approximately 35% of the spacing S. More preferably, the gap G is approximately ⅓ of the spacings. It will be understood that with a normal amount of backlash between mating gear teeth, a small amount of angular movement of a pair of the taper gears 54 that are simultaneously engaged with the selector gear 56 can occur before relative movement is required at either of the respective one-way clutches 60. Thus it is contemplated that terminal axial movement of the selector gear 58 can be effected after power is beginning to be reapplied from the source 16, without significant loading of the actuator 24 that would otherwise result from torque loading between engaging gears of the transmission unit 12.

It will be understood that other tooth increments ΔT can be employed, with corresponding variations in the respective incremental ratios $N_i/N_{i+1}$ as well as the ratio range $N_1/N_N$, depending on a particular number of teeth being used, $N_1$ for example. In order to maintain practical gear tooth geometry, the spacing S, the tooth increment ΔT, and the diametral pitch are selected for the corresponding angle φ to be not greater than approximately 25°. There is no physical limit as to how small the angle φ can be; however, angles smaller than 12° may be impractical in that for many applications an excessive number of the taper gears 54 would be required to obtain a desired ratio range $N_1/N_N$.

The selector gear 58 is correspondingly formed as a straight spur gear of matching 10 DP and having a number of teeth $N_s$ that is suitably chosen compatible with a desired range of overall gear ratios of the transmission unit 12. By choosing N=9 and $N_1$=23, the ratio range $N_1/N_N$ is approximately 3.08 as described above in connection with FIG. 4. For this example, and with the selector gear 58 having 36 teeth, overall ratios $R_n$ are given in Table 1 for n=1 to 9, assuming that the cluster shaft 50 is driven at the same speed as the input shaft 14.

TABLE 1

Selected Gear Ratios, Example 1.

| Gear n | $N_n$ | $N_N/N_n$ | $R_n = N_S/N_n$ | $R_n/R_{n-1}$ |
|---|---|---|---|---|
| 1 | 23 | 3.085 | 1.565 |  |
| 2 | 29 | 2.448 | 1.240 | 1.260 |
| 3 | 35 | 2.030 | 1.006 | 1.207 |
| 4 | 41 | 1.730 | 0.878 | 1.173 |
| 5 | 47 | 1.510 | 0.770 | 1.145 |
| 6 | 53 | 1.338 | 0.679 | 1.128 |
| 7 | 59 | 1.203 | 0.610 | 1.111 |
| 8 | 65 | 1.092 | 0.554 | 1.102 |
| 9 | 71 | 1.000 | 0.507 | 1.092 |

Advantageously, the incremental ratios $R_n/R_{n-1}$ progressively decrease as higher gears are selected, as long as the tooth increment $\Delta T$ is constant between the adjacent taper gears 54. One rationale for this conclusion is that there is greater power available, in excess of that required for overcoming rolling and wind resistance, for acceleration and/or climbing at lower speeds. Also, the time required to accelerate in one gear over a given engine RPM range is significantly less in the lower gears than in higher ones. Thus the transmission unit 12 as shown in FIGS. 5 and 6 enables closer control of engine speed in the higher gears, at higher vehicle velocities. As discussed above, the functions of the input shaft 14 and the output shaft 20 can be reversed relative to the cluster shaft 50 and the selector shaft 56. In that case, however, the incremental ratios progressively increase as higher gears are selected, unless the tooth increment $\Delta T$ is progressively decreased in the higher gears. It will be understood that variation of the tooth increment $\Delta T$ between the various adjacent taper gears 54 requires corresponding variations in the spacing S along the cluster shaft 50, provided that cluster shaft 50 and the selector shaft 56 are rigidly straight. Should other considerations favor more closely spaced ratios in the lower gears relative to the higher gears, the alternative assignment of the input and output shafts 14 and 20 would normally be preferred.

As further shown in FIG. 5, the actuator 24 includes a fork dolly 70 for translating the selector gear 58 along the selector shaft 56, a control motor 72 that drives the dolly 70 by a lead screw 74, the lead screw 74 being coupled to the motor 72 by a drive gear 76 (see FIGS. 9 and 12.) that engages a driven gear 78, the driven gear 78 being fixed on the lead screw 74. As further shown in FIG. 5, the fork dolly 70 slidably engages a guide shaft 80 that is fixedly supported in the housing 52 for maintaining fixed alignment of the dolly 70 relative to the selector gear 58 without requiring frictional contact therewith. In the implementation of FIG. 5, a pair of ring members 82 are interposed on opposite sides of the selector gear 58 for low-drag engagement by the dolly 70. Each of the shafts 50, 56, and the lead screw 74, are rotatably supported on suitable bearings in a conventional manner.

An important feature of the present invention is that the actuator 24 is effective for translating the selector gear 58 between adjacent ones of the taper gears 54 during a very short interruption of power from the source 16. As discussed above, the controller 26 provides an enable signal E that is interrupted for an interval t when the actuator 24 is activated, whereby translation of the selector gear 58 is facilitated by a momentary absence of torque-loading between the selector shaft 56 and the gear 58. It is important that the interval t be short, less than approximately 0.2 second, for maintaining a desired level of performance, and for facilitating smooth control of the load. Preferably the interval t is very short, less than approximately 0.02 second, for rendering imperceptible the interruption of power. Accordingly, the actuator 24 is implemented for providing extremely quick translation of the selector gear 58. Particularly, the lead screw 74 and the gears 76 and 78 are configured for advancing the dolly 70 the spacing S in approximately 6 revolutions of the control motor 72. Using a high-performance stepper motor capable of 25,000 RPM, the 6 revolutions require approximately 6(60)/25,000=0.014 second. A motor suitable for use as the control motor 72 is available as model RM2690D from Semix Corp. of Freemont, Calif.

Figure 9:
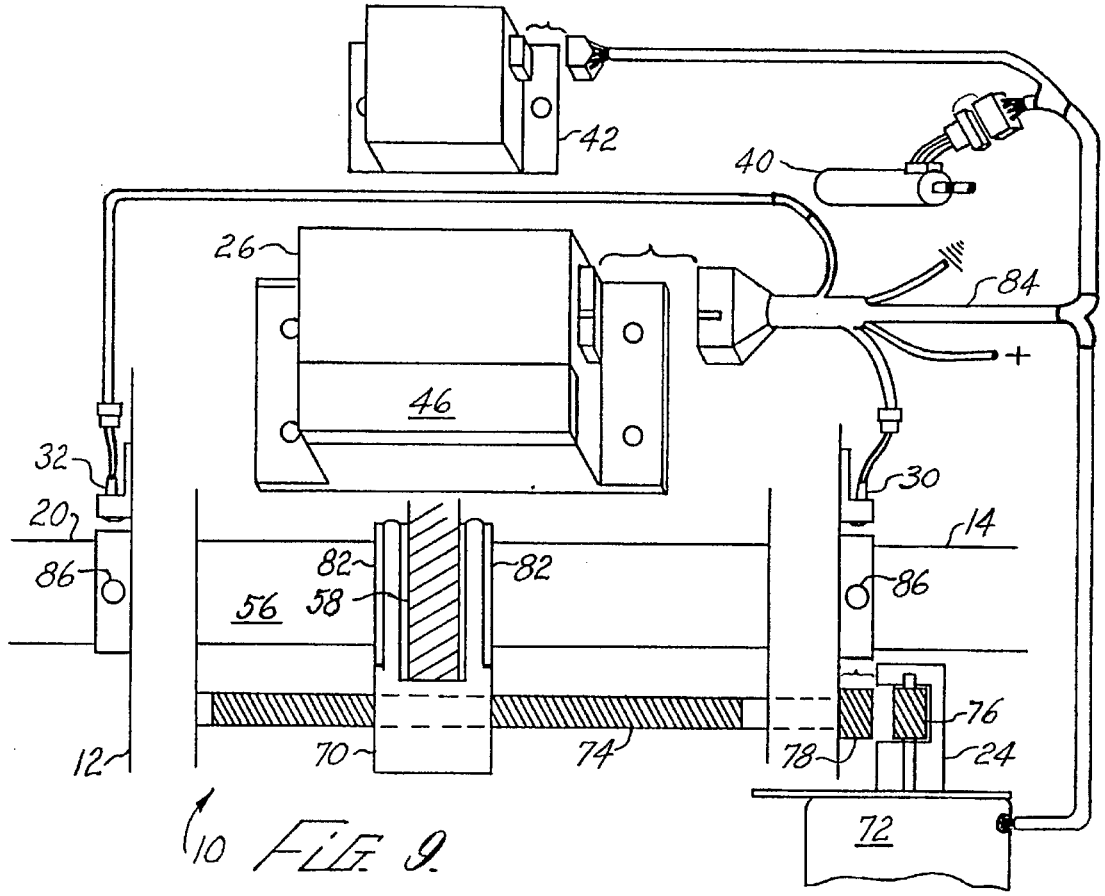
FIG. 9 is an exploded partial view of the system of FIG. 2.

As shown in FIG. 9, an exemplary configuration of the transmission system 10 includes a wiring harness for making electrical connections between the actuator 24, the controller 26, the sensors 30 and 32, throttle potentiometer 40, and the ECM 42. The sensors 30 and 32 are configured as magnetic pick-ups that are positioned for activation by respective sensor members 86 that are affixed relative to the input shaft 14 and the output shaft 20. Further, the controller 26 has the firmware 46 of the microprocessor 44 configured as a replaceable module, for quickly and easily tailoring the transmission system 12 to different characteristics of the power source 16 and the load 22, as well as to variant performance objectives thereof.

Figure 11:
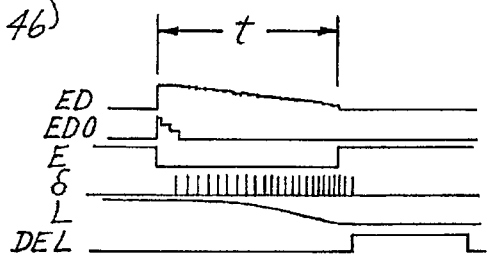
FIG. 11 is a timing chart showing operation of the controller program of FIG. 10.

As shown in FIGS. 10 and 11, the firmware 46 includes a shift control program 100 that monitors operation of the transmission system 10 for controlling the enable signal E and the shift actuator 24 as described herein. Following activation of the program 100, a coast test step 102 is performed for determining whether torque loading of the transmission unit 12 is present. In an exemplary implementation of the controller 26, the coast test step 102 is performed by comparing the speed of the input shaft with a theoretical speed of the input shaft based on the sensed speed of the output shaft and the gear selection n. Thus, if $S_I \leq N_n S_O$, coasting is deemed to be present. It will be understood that operation of the coast test step 102 can be based on any of several types of force or strain detectors. If coasting is not present, the controller 26 is operative for interrupting the enable signal E as described above in the manner described herein, the program 100 transferring control to an underspeed test step 104 for determining whether the input speed $S_I$ is below a predetermined rate, in which case a low gear test 106 transfers control back to the coast test 102 for repeating the program 100 in the event the transmission unit 12 already has the lowest gear (n=1) selected. For this purpose, a variable n is maintained in the microprocessor 44, n being set corresponding to a previously selected one of the taper gears $54_n$. If n≠1, a set down step 108 is entered for initiating a power downshift by first setting initial values ED and ED0 into internal clock timer memory locations of the microprocessor 44, wherein, ED represents a number of clock periods of the interval t, and ED0 represents a number of clock periods corresponding to propagation from an interruption of the signal E to a consequent material decrease in torque loading of the transmission unit 12 whereby the actuator 24 begins to be responsive to the controller 26. In the set down step 108, the signal E is disabled by setting a corresponding variable E=0, and a shift increment Δ is set to −1, signifying a single downshift. Control is next passed to a begin shift step 110, wherein the increment Δ is algebraically added to the variable n, and a stored drive distance L is set to MΔ, M being the number of steps to be executed by the control motor 72 for moving the selector gear 58 between successive ones of the taper gears 54.

Upon completion of the begin shift step 110, a delay wait loop 112 is entered for allowing propagation of the power interruption resulting from the momentary inactivation of the enable signal E to reach the transmission unit 12 before activation of the actuator 24, the loop 112 being exited when ED0, previously stored, reaches zero Next, a step drive increment δ is fed to the actuator 24 and the stored distance L is decremented by the increment δ in a drive step 114, δ being signed in correspondence with the sign of the increment Δ for producing a proper direction of rotation of the control motor 72. It will be understood that details of the hardware and firmware interface between the drive step 114 and the actuator 24, including appropriate control dynamics, travel limits and initialization, are known to those having skill in positioner control arts. Following the drive step 114, a delay test step 116 is done for determining conclusion of the interval t, i.e., once the timer variable ED reaches zero, at which point the enable signal E is reactivated in an enable restore step 118. Finally, completion of actuator drive is determined in a test done step 120, based on whether the drive distance L has reached zero as a result of successive operations of the drive step 114. If not, control is returned to the drive step 114 for continued activation of the actuator 24; otherwise, control is returned to the coast test step 102 following a counterpart of the enable restore step 118 for insuring that the enable signal E is not inactivated indefinitely in case completion of actuator drive occurs prior to underflow of the timer variable ED, and further following a delay step 122. It will be understood that the enable signal normally will be restored just before the gearshift is physically completed, in anticipation of a short time delay in the resumption of power to the transmission unit 12. The purpose of the delay step 122 is to allow time for the input speed $S_I$ to stabilize following a power shift so that further operation of the program 100 upon reentry at the coast test step 102 faithfully reflects control responses of the transmission system 10.

Following a negative result of the underspeed test step 104, control is passed to an overspeed test step 124 for determining whether the input speed $S_I$ is above a predetermined rate, in which case a high gear test 126 transfers control back to the coast test 102 for repeating the program 100 in the event the transmission unit 12 already has the highest gear (n=N) selected. It will be noted that this branch of the program 100 is essentially a mirror image of that previously described above in connection with the steps 104, 106, etc. Thus if n≠N, a set up step 128 is entered for initiating a power upshift, also by first setting counterparts of the initial values ED and ED0 into the clock timer memory locations of the microprocessor 44. It is contemplated that different values of ED and ED0 will be preferred than for the set down step 108 in that the dynamics of power upshifts and downshifts are expected to be somewhat divergent. In the set up step 128, the variable E is again set to zero; however, the shift increment Δ is set to +1, signifying a single upshift. Control is next passed to the begin shift step 110, the program 100 continuing as described above.

When the result of the coast test step 102 is affirmative, control is passed to a coast setup step 130, wherein a variable X corresponding to a target gear selection is evaluated as a function of the output speed $S_O$, the shift increment Δ being also set to X−n. For example, X can be evaluated as follows:

```
        SET X = n
LOOP1   IF S_E < N_X*S_O
         IF X < N
          X = X + 1
          GOTO LOOP1
         ELSE RETURN
LOOP2   IF S_E > N_X*S_O
         IF X > 1
          X = X − 1
          GOTO LOOP2
        RETURN
```

Following the coast setup step 130, control is passed to the begin shift step 110, described above. The coast test step 102, in combination with the coast setup step 130 advantageously provides proper gear selection in advance of positive drive by the power source 16 while avoiding interruptions of the enable signal E during coasting. It is contemplated that the program 100 will cycle many times per second, the dominant time-consuming elements being the delay test step 116 and the delay step 122. Thus the program 100 continuously monitors operation of the transmission system 10, effecting upshifts and downshifts in a predetermined manner for facilitating efficient operation of the power source 16 whenever power is required therefrom.

With further reference to FIG. 12, an alternative configuration of the transmission unit 12 has a counterpart of the counter gear, designated 68', affixed to the cluster shaft 50 external of the housing 52 for engaging an external counterpart of the input gear 66. Thus a counterpart of the input shaft 14 carrying the input gear counterpart would be physically outside the housing 52. Alternatively, a suitable shaft coupling can be substituted for the counter gear 68', whereby the cluster shaft 50 functions as the input shaft 14. In the configuration of FIG. 12, either or both ends of the selector shaft 56 can function as the output shaft 20.

The transmission unit 12 of FIG. 12 has counterparts of the taper gears, designated 54', each of the taper gears $54_2$' through $54_N$' being axially movable a short distance on the cluster shaft 50 against a helical compression synchronizing spring 88 that urges the gear $54_N$' toward the taper gear $54_1$'. Mating side surfaces of adjacent ones of the taper gears 54' are formed having complementary sloping ramps 90, the combination of the spring 88 and the ramps 90 urging the gears 54' into predetermined phase relationships relative to teeth formed on the respective gears, for facilitating smooth entry of the selector gear 58 into successive engagements with the various taper gears 54'.

The transmission system 10 of the present invention thus provides a particularly advantageous combination wherein the speed and torque loading of the power source 16 is actively controlled to smoothly, effectively and efficiently drive the load 22 over a wide range of operating conditions.

Although the present invention has been described in considerable detail with reference to certain preferred versions thereof, other versions are possible. For example, the efficiency speed $S_E$ can be programmed as a variable in the firmware 46, being dependent on the set-point variable (throttle position), the output speed $S_O$, or a combination of variables. Also, "drive-by-wire" control can be substituted for the throttle mechanism 38. Further, some or all of the gears in the transmission unit 12 can be helical gears, suitable provisions being made for accommodating the resulting axial bearing loadings. Moreover, other means for powering the actuator 24 can include pneumatic, vacuum, mechanical, and hydraulic devices. Therefore, the spirit and scope of the appended claims should not necessarily be limited to the description of the preferred versions contained herein.

What is claimed is:

1. A variable ratio transmission system for use with a controllable source of rotational power for powering a variable load, comprising:

(a) a selector shaft having a selector gear axially movable thereon, the selector gear having an axial selector face width;

(b) a selector actuator for driving the selector gear along the selector shaft in response to an external signal;

(c) a cluster shaft having a plurality N of spur gears rotatably supported thereon, the cluster shaft being inclined relative to the selector shaft, the spur gears each having a cluster face width and being sized and spaced along the cluster shaft for being selectively meshed with the selector gear, at least N−1 of the spur gears being variably coupled to the cluster shaft for rotation therewith, the selector shaft and the cluster shaft being series-coupleable between the source of rotational power and a load for driving the load through the selector gear and one of the spur gears; and (d) a controller for activating the selector actuator while preventing substantial torque-loading of any of the spur gears unless that spur gear is axially in mesh with the selector gear at least approximately 25% of the lesser of the selector face width and the cluster face width of that spur gear, the controller being operative for interrupting power from the source for an interval t, the interval t being less than approximately 0.2 second.

2. The transmission system of claim 1, wherein each of the at least N−1 spur gears is coupled to the cluster shaft by a one-way clutch.

3. The transmission system of claim 2, wherein each of the N spur gears is coupled to the cluster shaft by a one-way clutch.

4. The transmission system of claim 1, including means for biasingly synchronizing adjacent ones of the spur gears in a predetermined phase relationship.

5. The transmission system of claim 4, wherein the means for synchronizing includes axially engaging ramp surfaces on adjacent ones of the spur gears, at least some of the spur gears being axially movable relative to the cluster shaft in response to relative rotation of the adjacent spur gears, and a biasing element axially loading the ramp surfaces.

6. The transmission system of claim 5, wherein the biasing element is a compression spring on the cluster shaft, the compression spring being located on one side of all of the at least N−1 spur gears for yieldably resisting axial separation thereof.

7. The transmission system of claim 1, wherein the actuator comprises a fork dolly supported for movement parallel to the selector shaft, a lead screw rotatably mounted in parallel relation to the selector shaft and threadingly coupled thereto, and a control motor coupled for rotating the lead-screw shaft in response to the controller.

8. The transmission system of claim 7, wherein the interval t is not greater than approximately 0.01 second.

9. The transmission system of claim 8, wherein the control motor is a stepper motor, the actuator further comprising a gear coupling between the stepper motor and the lead screw.

10. The transmission system of claim 1, wherein the controller includes means for comparing a set of operating conditions of the power source with a predetermined operating envelope, and means for activating the actuator for bringing the set of operating conditions within the operating envelope.

11. The transmission system of claim 10, wherein the operating conditions include an input operating speed and a set point variable, the set point variable including a member of the group consisting of throttle position, torque, power, applied voltage, applied current, modulation duty cycle, and acceleration.

12. The transmission system of claim 10, wherein the operating envelope includes a limiting input speed in association with a maximum output speed, and a threshold input speed in association with a minimum output speed.

13. The transmission system of claim 1, further comprising an auxiliary shaft, the auxiliary shaft being rotatably mounted in concentric relation to one of the cluster shaft and the selector shaft, and being gear-coupled to the other of the cluster shaft and the selector shaft for in-line connection of the transmission system between the power source and the load.

14. The transmission system of claim 1, wherein adjacent faces of the spur gears are separated by a gap G, an interval spacing S of the spur gears being the cluster face width plus the gap G, and the gap G is between approximately 15 percent and approximately 35 percent of the spacing S.

15. The transmission system of claim 14, wherein the gap G is approximately 1/3 of the spacing S.

16. The transmission system of claim 1, wherein the controller is operative for delaying activation of the selector actuator for a predetermined delay period following commencement of the interval t.

17. The transmission system of claim 1, wherein the controller is operative for terminating the interval t during activation of the selector actuator.

18. The transmission system of claim 8, wherein the actuator is operable for moving the selector gear an interval spacing S of the spur gears within approximately 0.014 second.

19. A variable ratio transmission system for use with a controllable source of rotational power for powering a variable load, comprising:

(a) a selector shaft having a selector gear axially movable thereon, the selector gear having an axial selector face width;

(b) a selector actuator for driving the selector gear along the selector shaft in response to an external signal, the actuator comprising a fork dolly supported for movement parallel to the selector shaft, a lead screw rotatably mounted in parallel relation to the selector shaft and threadingly coupled thereto, and a control motor coupled for rotating the lead-screw shaft;

(c) a cluster shaft having a plurality N of spur gears rotatably supported thereon, the cluster shaft being inclined relative to the selector shaft, the spur gears each having a cluster face width and being sized and spaced along the cluster shaft for being selectively meshed with the selector gear, at least N−1 of the spur gears being variably coupled to the cluster shaft by a one-way clutch for rotation therewith, the selector shaft and the cluster shaft being series-coupleable between the source of rotational power and a load for driving the load through the selector gear and one of the spur gears; and (d) a controller for activating the control motor of the selector actuator while preventing substantial torque-loading of any of the spur gears unless that spur gear is axially in mesh with the selector gear at least approximately 25% of the lesser of the selector face width and the cluster face width of that spur gear, the controller including means for comparing a set of operating conditions of the power source with a predetermined operating envelope, and means for activating the actuator for bringing the set of operating conditions within the operating envelope, the operating conditions including an input operating speed and a set point variable, the set point variable including a member of the group consisting of throttle position, torque, power, applied voltage, applied current, modulation duty cycle, and acceleration, the controller being operative for interrupting power from the source for an interval t, the interval t being less than approximately 0.2 second.

* * * * *